United States Patent
Watanabe et al.

(10) Patent No.: US 6,880,421 B2
(45) Date of Patent: Apr. 19, 2005

(54) ROLLED BALL SCREW AND METHOD FOR ROLLING BALL SCREW GROOVE

(75) Inventors: Yasumi Watanabe, Gunma (JP); Hitoshi Sannomiya, Gunma (JP)

(73) Assignee: NSK Ltd., Tokyo (JP)

( * ) Notice: Subject to any disclaimer, the term of this patent is extended or adjusted under 35 U.S.C. 154(b) by 211 days.

(21) Appl. No.: 10/321,638

(22) Filed: Dec. 18, 2002

(65) Prior Publication Data
US 2003/0121346 A1 Jul. 3, 2003

(30) Foreign Application Priority Data
Dec. 19, 2001 (JP) .................................... P.2001-386638

(51) Int. Cl.[7] .................................................. F16H 1/18
(52) U.S. Cl. .............................. 74/424.75; 74/424.81; 72/83; 72/98
(58) Field of Search ......................... 74/89.23, 424.71, 74/424.75, 424.81–424.93; 72/83, 88, 98, 104

(56) References Cited

U.S. PATENT DOCUMENTS

| 1,989,611 | A | * | 1/1935 | Dall et al. | 74/424.75 |
| 2,937,547 | A | * | 5/1960 | Moeltzner | 72/95 |
| 4,221,137 | A | * | 9/1980 | Futaba | 74/216.3 |
| 6,708,544 | B1 | * | 3/2004 | Sannomiya | 72/103 |

* cited by examiner

*Primary Examiner*—David A. Bucci
*Assistant Examiner*—Timothy McAnulty
(74) *Attorney, Agent, or Firm*—Sughrue Mion, PLLC (57) ABSTRACT

A rolled ball screw has a screw shaft having a ball screw groove so as to engaging with rolling elements of a ball screw, the screw shaft is formed by rolling while a thread rolling die is pressed against a cylindrical bar-shaped member to thereby roll the ball screw groove, wherein the number of waves per circumference per lead of said ball screw groove is set different from the integer multiples of the number of said rolling elements per lead of said ball screw groove.

2 Claims, 6 Drawing Sheets

DIE SPECIFICATIONS

FIG. 9

ROLLED BALL SCREW AND METHOD FOR ROLLING BALL SCREW GROOVE

BACKGROUND OF THE INVENTION

1. Field of the Invention

The present invention relates to a ball screw groove rolling method used in manufacturing a screw shaft of a ball screw.

2. Description of the Related Art

A screw shaft of a ball screw (which is hereinafter referred to as a ball screw shaft) is generally structured in such a manner that a ball screw groove is formed in a cylindrical bar-shaped member; and, when such ball screw shaft is manufactured by rolling, in many cases, there is employed a method which is referred to as a through rolling method. This through rolling method is a method in which a ball screw groove is rolled in a cylindrical bar-shaped member using a so called walking phenomenon; and, this walking phenomenon is a phenomenon in which there is formed a slight angle difference between the lead angle of a thread rolling die and the lead angle of a ball screw groove to be rolled, and a bar member is allowed to move between the thread rolling dies in the axial direction according to the thus formed angle difference.

In case where a ball screw groove is rolled in a bar-shaped member according to such through rolling method, there can be obtained a ball screw shaft which has a length greater than the width of the thread rolling die, which makes it possible to reduce the size of a thread rolling machine which is used to manufacture a ball screw shaft.

However, in case where a ball screw groove is rolled according to the above-mentioned conventional method, in a bar-shaped member in which the ball screw groove is rolled, there occur cyclically the following error components: that is, (1) an error component in the ball screw groove due to the swinging motion of a work (a bar-shaped member); (2) an error component in the ball screw groove due to the swinging motion of a thread rolling die; and, (3) an error component in the ball screw groove due to a difference between the number of grooves of the thread rolling die and the number of grooves of the ball screw. Especially, there is a possibility that, when the ball screw groove rolled in the bar-shaped member moves out from between the thread rolling dies, stresses can be concentrated on the edge portions of the thread rolling dies and such stress concentration can crush the surface of the bar-shaped member too excessively. In case where such phenomenon occurs intermittently, the ball screw groove rolled in the bar-shaped member is made corrugated in shape; and thus, in case where the ball screw is operated at a high speed, vibrations are easy to occur and, as a result of this, there is a fear that noises can be generated and the positioning precision can be degraded. Also, there arises a possibility that the operation performance of the ball screw can be lowered and the rigidity thereof can be unstabilized.

SUMMARY OF THE INVENTION

The present invention aims at eliminating the above-mentioned drawbacks found in the conventional rolled ball screw. Accordingly, it is an object of the present invention to provide a rolled ball screw and a ball screw groove rolling method in which, even when the ball screw is operated at a high speed, generation of vibrations giving rise to generation of noises can be restricted as well as the operation performance of the ball screw can be enhanced and the rigidity of the ball screw can be stabilized.

In attaining the above object, according to a first aspect of the present invention, there is provided a rolled ball screw comprising a screw shaft having a ball screw groove so as to engaging with rolling elements of a ball screw, the screw shaft is formed by rolling while a thread rolling die is pressed against a cylindrical bar-shaped member to thereby roll the ball screw groove, wherein the number of waves per circumference per lead of said ball screw groove is set different from the integer multiples of the number of said rolling elements per lead of said ball screw groove.

Also, according to a second aspect of the present invention, there is provided a ball screw groove rolling method comprising step of pressing a thread rolling die against a cylindrical bar-shaped member to thereby roll a ball screw groove engaged with the rolling elements of a ball screw therein, wherein the number of grooves and lead angle of said thread rolling die are set in such a manner that the number of waves per circumference per lead of said ball screw groove is incongruent with the integer multiples of the number of said rolling elements per lead of said ball screw groove.

According to the first and second aspects of the present invention, since the number of waves per circumference per lead of the ball screw groove does not coincide with the integer multiples of the number of the rolling elements per lead of the ball screw groove, even in case where the ball screw is operated at a high speed, there can be restricted generation of vibrations which can give rise to generation of noises. That is, in case where the number of waves per circumference per lead of the ball screw groove to be rolled in the bar-shaped member coincides with the integer multiples of the number of the rolling elements per lead of the ball screw groove, vibrations which can give rise to generation of noises are prone to occur. However, in case where the number of waves per circumference per lead of the ball screw groove to be rolled in the bar-shaped member does not coincide with the integer multiples of the number of the rolling elements per lead of the ball screw groove, the vibrations which can give rise to generation of noises, are difficult to occur. Also, according to the present invention, since the number of waves per circumference per lead of the ball screw groove does not coincide with the integer multiples of the number of the rolling elements per lead of the ball screw groove, the ball preload amount can be stabilized as a whole, which can enhance the operation performance of the ball screw and also can stabilize the rigidity thereof.

BRIEF DESCRIPTION OF THE DRAWINGS

FIGS. 8 and 8A are views to show a method for measuring the number of waves per circumference of a ball screw shaft, wherein

DETAILED DESCRIPTION OF THE REFERRED EMBODIMENTS

Now, description will be given below of an embodiment of a method for rolling a ball screw groove according to the present invention with reference to the accompanying drawings.

Figure 1:
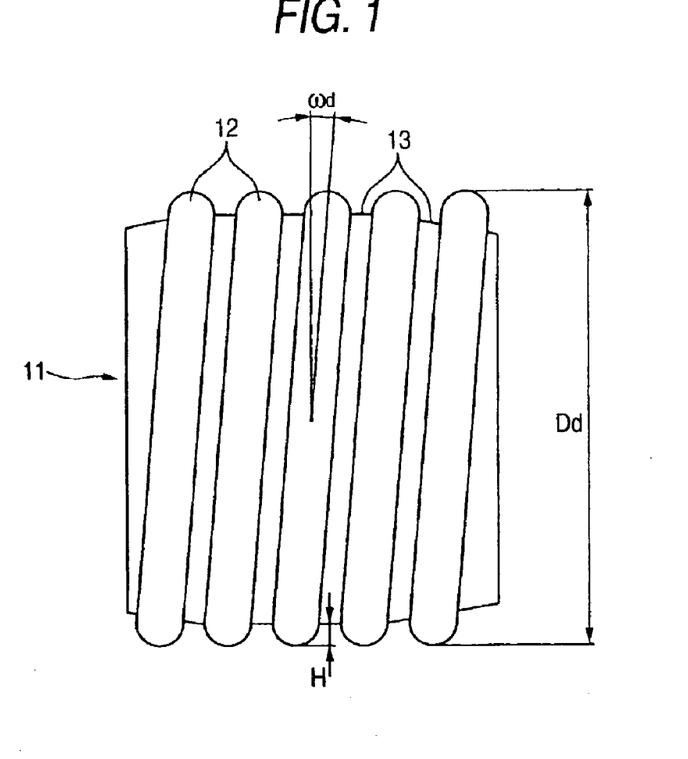
FIG. 1 is a view of an example of a thread rolling die used in a ball screw groove rolling method according to the present invention.

FIG. 1 is a view of an example of a thread rolling die which is used in a method for rolling a ball screw groove according to the present invention. As shown in FIG. 1, a thread rolling die 11 is formed in a roller shape and, in the outer peripheral surface of the thread rolling die 11, there are formed spiral-shaped projecting strips 12 at a given lead angle $\omega_d$ which can be used to roll a ball screw groove in a cylindrical bar-shaped member. And, between the mutually adjoining two projecting strips 12, there is formed a spiral groove 13 at a given lead angle $\omega_d$ which can be used to roll a ball screw thread in a cylindrical bar-shaped member.

Figure 2:
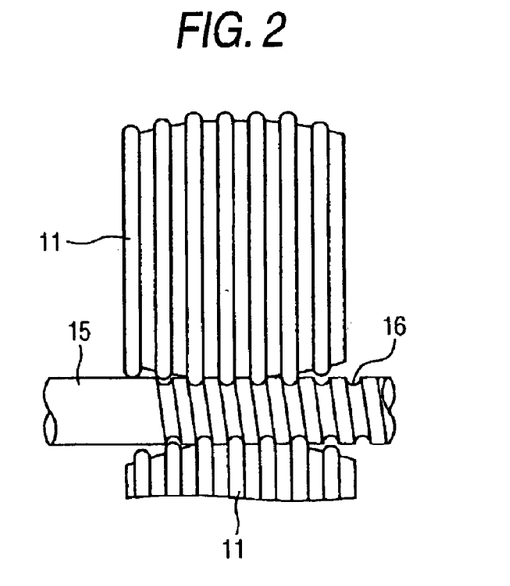
FIG. 2 is a view to show a method a ball screw groove in a bar-shaped member using the thread rolling die shown in FIG. 1.

When rolling a ball screw groove in a bar-shaped member serving as a work using the thus structured thread rolling die 11, as shown in FIG. 2, a bar-shaped member 15 is pressed against the spiral-shaped projecting strips 12 and a ball screw groove 16 is thereby rolled in the bar-shaped member 15 according to the before-mentioned through thread rolling method. At the then time, the die outside diameter $D_d$ of (see FIG. 1) and die lead angle $\omega_d$ of the thread rolling die are set so properly that the number of threads (in which, in a rolling operation, errors have occurred due to the vibrations of the work, due to the rotational vibrations of the dies and due to the difference between the number of the grooves of the die and the number of grooves of the ball screw) per lead of the ball screw groove, that is, the number of waves per circumference per ball screw groove does not coincide with the integer multiples of the number of rolling elements per ball screw groove lead.

In this case, while a gap between the rolling elements caused by the difference between the total number of rolling elements and the length of the rolling element circulation passage is considered, a certain latitude should be allowed in the number of rolling elements per ball screw groove lead. Also, in consideration of the fact that, in the thread rolling operation, the inclination angle of the die is slightly varied so as to fine adjust the lead of the ball screw groove, or the set distance between the dies is changed so as to adjust the effective diameter of the screw groove to be rolled, a certain latitude should be allowed in the number of waves per circumference.

The number of rolling elements to be engaged with the ball screw groove per lead of the ball screw groove, as shown in the following table 1, can be found by calculation using the following formula.

$$N_B = \frac{\pi \times dm}{Da} \times \sqrt{1 + \tan^2\beta} \times \alpha$$

where dm: ball pitch circle diameter

Da: rolling element diameter

β: lead angle

α: (0.93 to 1) ball loading rate.

TABLE 1

| Degree | Number of balls to be inserted per lead |
|---|---|
| 1 | 22.4 to 24.1 |
| 2 | 44.8 to 48.2 |
| 3 | 67.3 to 72.3 |
| 4 | 89.7 to 96.4 |
| 5 | 112.1 to 120.5 |

Also, the number of waves per circumference N per lead of ball screw groove can be found from the following formula (6), where the outside diameter of the thread rolling die 11 is expressed as $D_d$, the groove height of the thread rolling die 11 is expressed as H, the number of grooves of the thread rolling die 11 is expressed as $m_d$, the outside diameter of the bar-shaped member is expressed as $D_W$, the shaft outside diameter of the ball screw is expressed as $D_e$, the lead of the ball screw groove 16 to be rolled in the bar-shaped member 15 is expressed as L, the number of grooves of the ball screw groove 16 is expressed as $m_s$, the rolling element diameter coefficient is expressed as κ, and the axial direction moving amount of the bar-shaped member 15 per die rotation is expressed as $S_s$.

$$m = \frac{m_d}{m_s} \quad (1)$$

$$\omega_d = \tan^{-1}\left[\frac{L \times m}{\pi(D_d - \kappa \times H)}\right] \quad (2)$$

$$\omega_s = \tan^{-1}\left[\frac{L}{\pi(D_s - (2-\kappa) \times H)}\right] \quad (3)$$

$$\kappa = \frac{D_W - D_S + 2H}{H} \quad (4)$$

$$S_S = \pi(D_d - \kappa \times H)\sin(|\omega_s - \omega_d|) \quad (5)$$

$$N = \frac{mL}{S_s} \quad (6)$$

Figure 3:
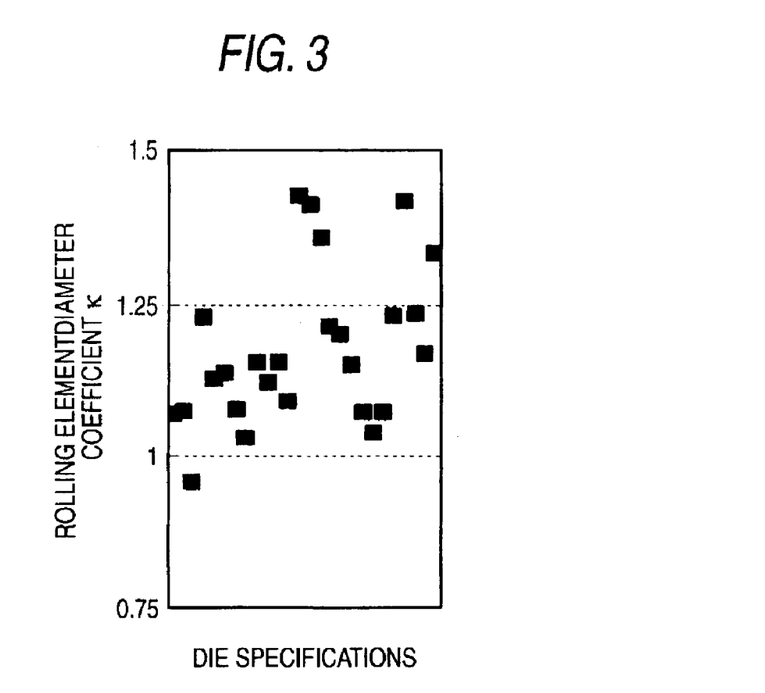
FIG. 3 is a graphical representation of the relationship between the rolling diameter coefficient and die specifications.

By the way, the rolling element diameter coefficient κ, as shown in FIG. 3, takes the value, κ is from 0.9 to 1.5; however, it can also be obtained from the formula (4).

Table 2 shows the specifications of a thread rolling die used in the present invention and a conventional thread rolling die.

TABLE 2

| Die Specifications | Before Improved | After Improved |
|---|---|---|
| Die outside diameter mm | 194 | 194 |
| Die groove height mm | 1.244 | 1.244 |
| Die groove number | 80 | 78 |

TABLE 2-continued

| Die Specifications | Before Improved | After Improved |
|---|---|---|
| Die lead angle (deg) | 33.517 | 32.852 |
| Ball screw shaft outside diameter mm | 20 | 20 |
| Ball screw lead mm | 40 | 40 |
| Ball screw groove number | 8 | 8 |
| Number of waves per circumference | 45.99 | 24.84 |

As shown in Table 2, in case where a ball screw groove 16 is rolled in a bar-shaped member 15 using a thread rolling die having a die outside diameter of 194 mm, a die groove number of 80 and a die lead angle of 33.517°, the number of waves per circumference N per ball lead of the ball screw groove coincides with the integer multiples of the rolling element number shown in Table 1. However, in case where a ball screw groove 16 is rolled in a bar-shaped member 15 using a thread rolling die having a die outside diameter of 194 mm, a die groove number of 78 and a die lead angle of 32.852°, the number of waves per circumference N per lead of the ball screw groove does not coincide with the integer multiples of the rolling element number shown in Table 1.

Figure 4:
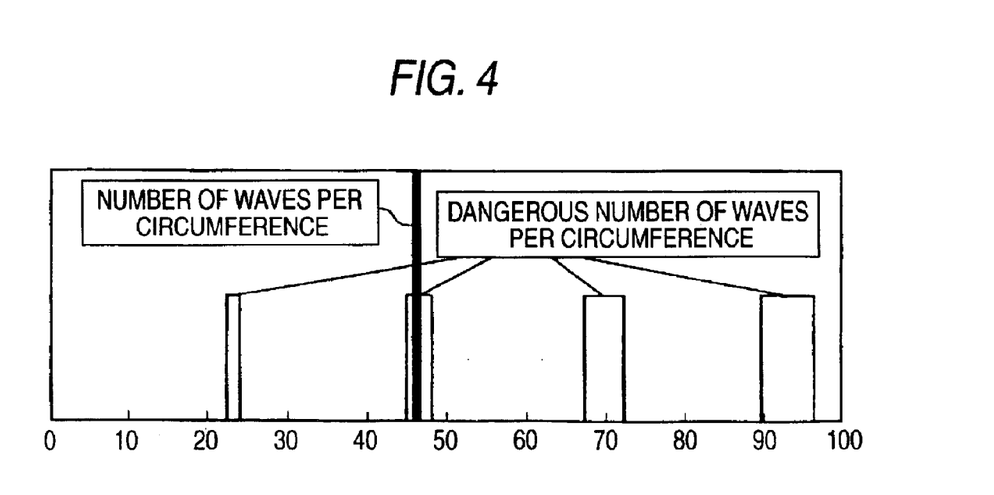
FIG. 4 is a graphical representation of the analysis results of the relationship between the number of waves per circumference and the number of rolling elements when a ball screw groove is rolled in a bar-shaped member using a thread rolling die having a die outside diameter of 194 mm, a die groove number of 80 and a die lead angle of 33.517°.

Now, FIG. 4 shows the analyzed results of the relationships between the number of waves per circumference and rolling element number when the ball screw groove 16 is rolled in the bar-shaped member 15 using a thread rolling die having a die outside diameter of 194 mm, a die groove number of 80 and a die lead angle of 33.517°. And, FIG. 5 shows the analyzed results of the relationships between the number of waves per circumference and rolling element number when the ball screw groove 16 is rolled in the bar-shaped member 15 using a thread rolling die having a die outside diameter of 194 mm, a die groove number of 78 and a die lead angle of 32.852°.

Referring to FIG. 4, in case where the ball screw groove 16 is rolled in the bar-shaped member 15 using a thread rolling die having a die outside diameter of 194 mm, a die groove number of 80 and a die lead angle of 33.517°, the number of waves per circumference is 45.99 which coincides with a dangerous number of waves per circumference ranging from 44.8 to 48.2. The dangerous number of waves per circumference means a number of waves of the integer multiples of the number of said rolling elements per lead having a breadth.

Figure 5:
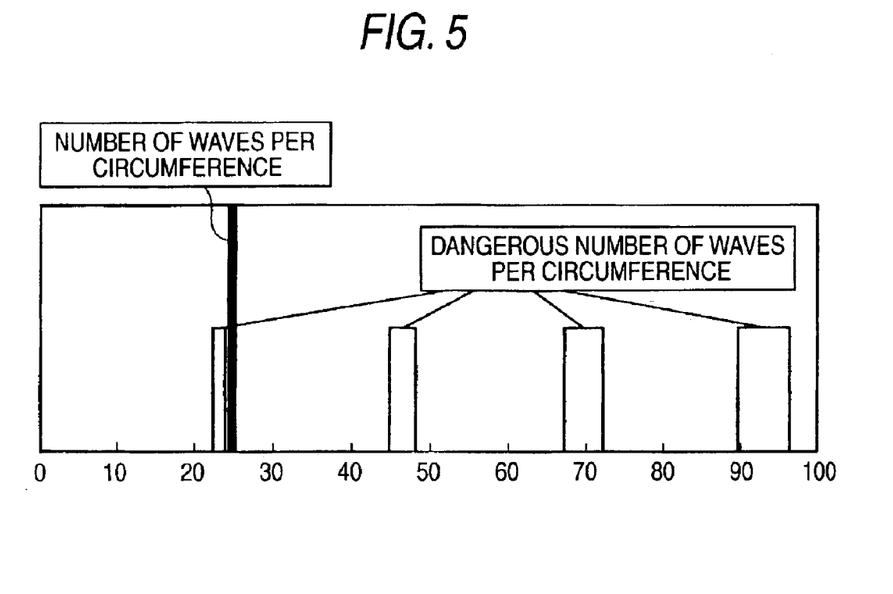
FIG. 5 is a graphical representation of the analysis results of the relationship between the number of waves per circumference and the number of rolling elements when a ball screw groove is rolled in a bar-shaped member using a thread rolling die having a die outside diameter of 194 mm, a die groove number of 78 and a die lead angle of 32.852°.

On the other hand, in case where the ball screw groove 16 is rolled in the bar-shaped member 15 using a thread rolling die having a die outside diameter of 194 mm, a die groove number of 78 and a die lead angle of 32.852°, as shown in FIG. 5, the number of waves per circumference is 24.84 which does not coincide with any one of the dangerous number of waves per circumference.

Figure 6:
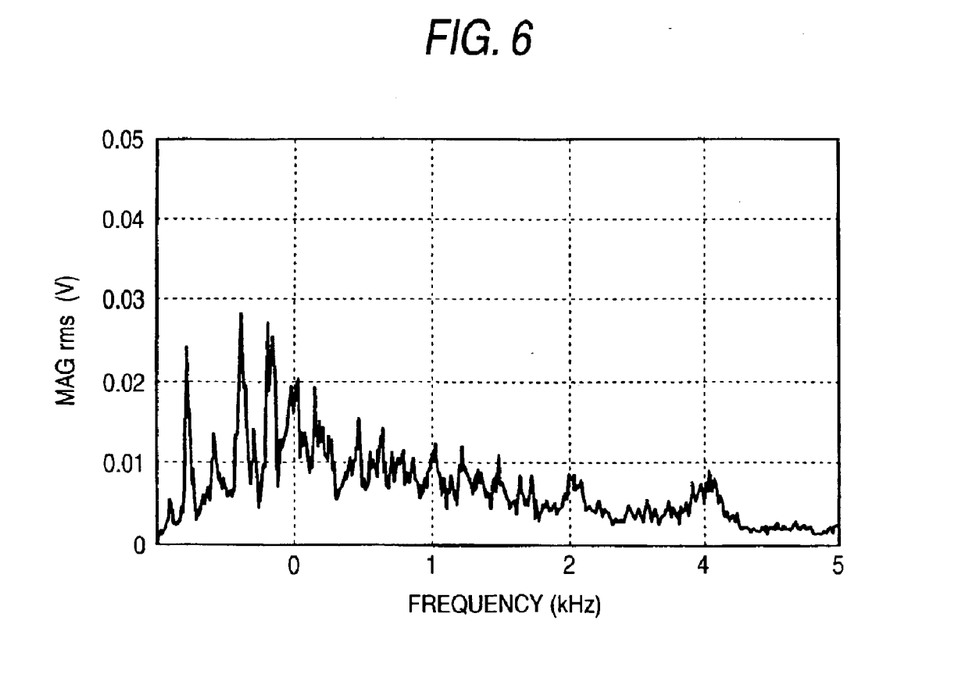
FIG. 6 is a graphic representation of the analyzed results of the noise characteristics of a ball screw when a ball screw groove is rolled according to a conventional method.
Figure 7:
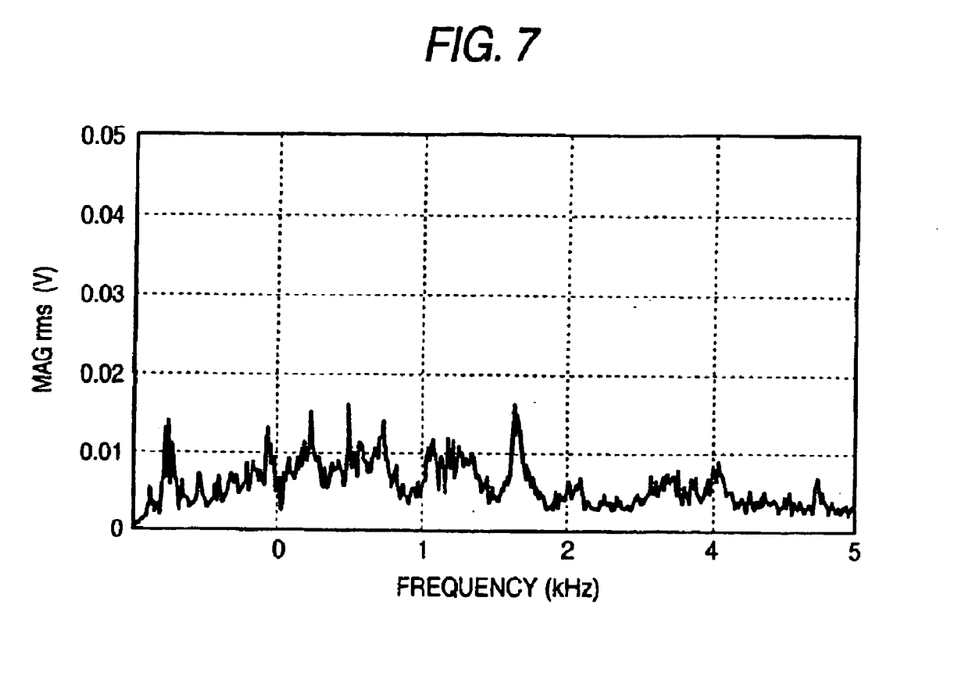
FIG. 7 is a graphic representation of the analyzed results of the noise characteristics of a ball screw when a ball screw groove is rolled according to a method of the present invention.

Now, FIG. 6 is a graphic representation of the analyzed results of the noise characteristics of a ball screw when a ball screw groove is rolled according to the conventional method. FIG. 7 is a graphic representation of the analyzed results of the noise characteristics of a ball screw when a ball screw groove is rolled according to a method of the present invention. From comparison between the analyzed results shown in FIG. 6 and the analyzed results shown in FIG. 7, it is found that, in the case of the conventional method, in an area of 1 kHz or less, there are found several high noise peaks which are caused by the chattered ball screw groove; whereas, in the case of the method according to the present invention, the peaks of the noise level are controlled down to low values.

Figure 8:
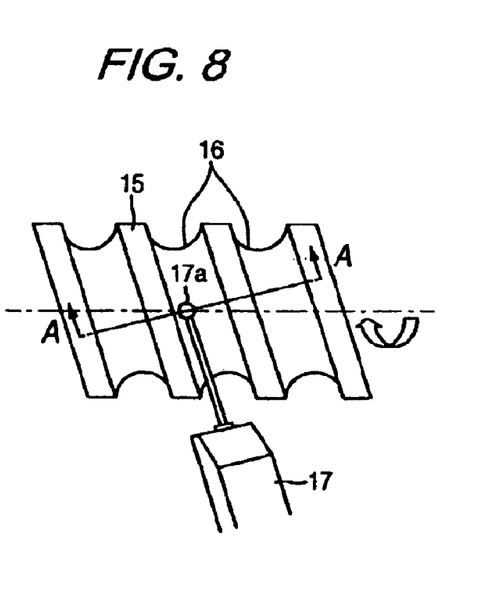
Figure 8A:
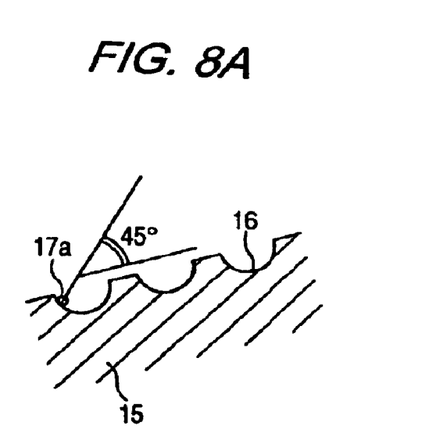
FIG. 8A is a cross-section view taken along line A—A of FIG. 8.

By the way, the number of waves per circumference of the ball screw shaft rolled using a thread rolling die can be measured according to a method shown in FIG. 8. That is, the contact piece 17a of an electrical micrometer calliper 17 is contacted with the screw groove 16 of the screw shaft 15 at an angle of about 45°. In this state, the screw shaft 15 is rotated, a shift amplitude of a swelling in the contact direction with the contact piece 17a in the screw groove surface extending along the screw groove direction of the screw shaft 15 is measured by the electrical micrometer calliper 17, thereby being able to find the number of waves per circumference in the ball screw.

TABLE 3

| Die outside diameter mm | 195 |
|---|---|
| Die groove height mm | 2.331 |
| Die groove number | 15 |
| Ball screw shaft outside diameter mm | 49.15 |
| Ball screw lead mm | 40 |
| Ball screw groove number | 4 |
| Number of waves per circumference | 12.47 |

Figure 9:
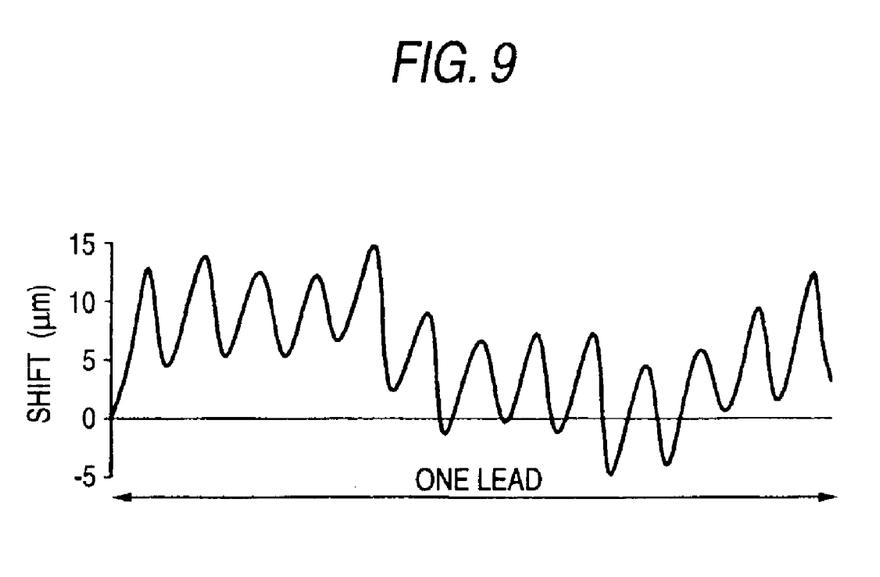
FIG. 9 is a graphical representation of the measured data of the number of waves per circumference; and, FIG. 10 is a graphical representation of the results that are obtained by FFT analyzing the measured data shown in FIG. 9.
Figure 10:
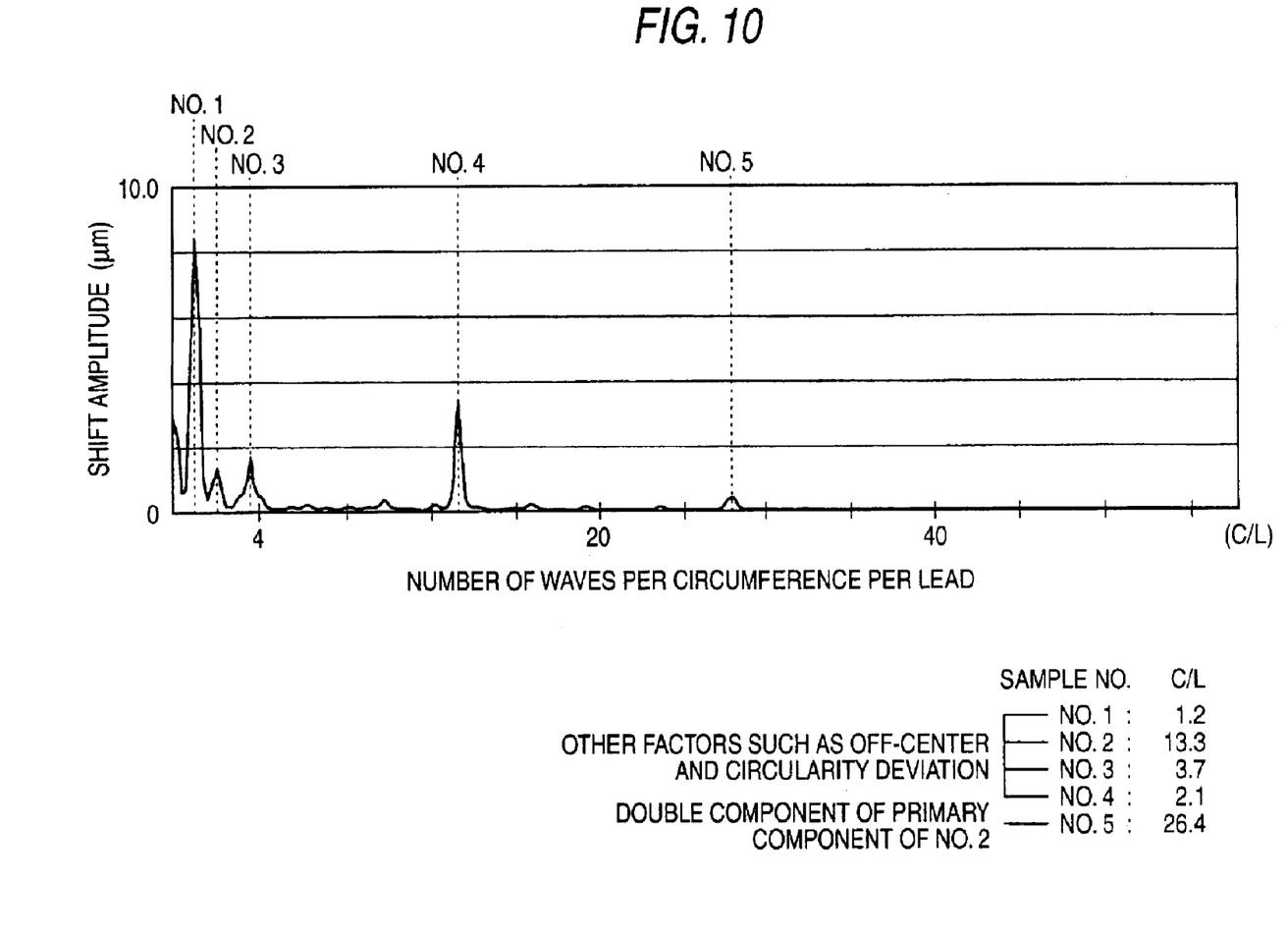

Now, FIG. 9 shows the measured data of the number of waves per circumference in the ball screw shaft rolled using a thread rolling die having the specifications shown in Table 3, and FIG. 10 shows the results obtained by FFT analyzed the measured data shown in FIG. 9. From FIGS. 9 and 10, it is found that the numbers of waves per circumference substantially coincide with the calculated values.

As described above, when the thread rolling die 11 is pressed against the cylindrical bar-shaped member 15 to thereby roll the ball screw groove 16 for engagement with the rolling elements of the ball screw in the bar-shaped member 15, in case where, while the groove number and lead angle of the thread rolling die 11 are set so properly that the number of waves per circumference per lead of the ball screw groove 16 does not coincide with the integer multiples of the number of rolling elements per lead of the ball screw groove, the ball screw groove 16 is rolled in the bar-shaped member 15. The number of waves per circumference per lead of the ball screw groove does not coincide with the integer multiples of the number of rolling elements per lead of the ball screw groove. So that, even in case where the ball screw is operated at a high speed, it is possible to restrict generation of the vibrations that can give rise to generation of noises.

By the way, the present invention is not limited to the above-mentioned embodiment. For example, in the above-mentioned embodiment, there is taken a rolling operation which uses two rollers; however, the present invention can also apply similarly to a rolling operation using three rollers. Also, referring to the die outside diameter, die groove number, die lead angle and ball screw specifications, in case where two of them are decided, the remaining two are naturally decided; and, therefore, in an actual operation, any two of them may be controlled.

As has been described heretofore, according to the present invention, even in case where the ball screw is operated at a high speed, it is possible to restrict generation of vibrations which can give rise to generation of noises. Also, it is possible to work or provide a ball screw which is excellent in operation performance and stable in rigidity.

What is claimed is:

1. A rolled ball screw comprising a screw shaft having a ball screw groove so as to engaging with rolling elements of a ball screw, the screw shaft is formed by rolling while a thread rolling die is pressed against a cylindrical bar-shaped member to thereby roll the ball screw groove, wherein the number of waves per circumference per lead of said ball screw groove is set different from the integer multiples of the number of said rolling elements per lead of said ball screw groove.

2. A ball screw groove rolling method comprising step of pressing a thread rolling die against a cylindrical bar-shaped member to thereby roll a ball screw groove engaged with the rolling elements of a ball screw therein, wherein the number of grooves and lead angle of said thread rolling die are set in such a manner that the number of waves per circumference per lead of said ball screw groove is incongruent with the integer multiples of the number of said rolling elements per lead of said ball screw groove.

* * * * *